UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BRIQUET AND PROCESS OF MAKING SAME.

1,311,222.  Specification of Letters Patent.  Patented July 29, 1919.

No Drawing.  Application filed August 16, 1917. Serial No. 186,481.

*To all whom it may concern:*

Be it known that I, CARLETON ELLIS, a citizen of the United States, and a resident of Montclair, in the county of Essex and State of New Jersey, have invented certain new and useful Improvements in Briquets and Processes of Making Same, of which the following is a specification.

This invention relates to making briquets by the use of a binding agent and relates particularly to the use of a binding composition or an adhesive formed by the solution of sulfite cellulose waste liquor solids in water or other aqueous medium, such solids being preferably produced in a dry pulverulent form, as by drying by atomization, and preferably these solids show an acid reaction, thus giving to the solution prepared therefrom a similar acid reaction, which solution of course, may be rendered of any degree of acidity or alkalinity by the addition of suitable bodies. In the following description the preparation of the sulfite liquor and certain of its applications, as for example, in the manufacture of briquets are set forth.

Sulfite waste liquor in a concentrated or solid form has been proposed as a binding material for briquets and the like, but being soluble in water briquets made from it will not stand the action of wet weather as when exposed to rain in open cars during transportation. Pitch and tar have been suggested as waterproofing agents for the sulfite liquor but owing to the smoke and soot produced by these there is little likelihood of general acceptance of binders of this character.

Many attempts have been made to render sulfite liquor waterproof but so far as I know, no satisfactory method to this end for making briquets and plastics has been devised.

I have found that the concentrated liquor, especially the more acid types of the sulfite waste liquor, are capable of being precipitated by lime to form a substantially insoluble body, so far as this art is concerned, and which enable briquets to be prepared which resist the disintegrating effects of water to the degree desired. It is of course, somewhat remarkable that sulfite waste liquor consisting so largely of lime compounds, should be precipitated by quicklime or hydrated lime, but such is the case, especially with the slightly acid varieties of the liquor. The liquors obtained from raw materials containing a rather high percentage of magnesia are preferable.

The product may be used for making flooring compounds, artificial stone, columns, and all sorts of plastics, as will now be evident.

In carrying out the method I may for example, take sulfite liquor preferably of an acid character, such as may be made by concentrating in an acid condition or partially neutralized state, or by acidifying the neutral concentrate. I do not mean to exclude the neutral or alkaline, or hydrolyzed, or other forms or derivatives of sulfite waste liquor or spruce or other cellulose liquors of a substantially equivalent character from the viewpoint of the present invention. The liquor is mixed with the materials to be bound together as coal dust or fines, culm, sawdust, mineral fillers, talc, magnesite, crushed rock, sand, fiber, asbestos, and the like, and then caustic lime in a finely divided condition may be admixed therewith. Reaction takes place almost immediately with some liquors and the insoluble compound is formed in and around the filling material. Sometimes the reaction is not immediate, especially when the sulfite liquor is diluted with 20 to 50% of water, or when the sulfite liquor solids are because of the nature of the concentration in a less unstable condition. Thus in various ways, the setting time may be controlled so that opportunity is afforded to work the plastic into suitable shape after mixing. Hydrated lime works usually a little slower than quick-lime. About 50% of lime reckoned on the weight of sulfite liquor of 30° Bé. is a satisfactory amount of precipitant. 30% and even less will serve but the setting time is greatly protracted, which of course, for some purposes, may not be undesirable. From 30-50% is however recommended for general operation. This may be exceeded in some cases.

In preparing a briquet from culm or coal material of various sorts the sulfite liquor may be mixed with this material to uniformly coat the particles thereof and the lime in fine powder may then be admixed, or the coal may first be floured with the lime and the sulfite liquor then added and thoroughly incorporated, briqueting following as soon as possible. Or the lime may be added in the form of the hydrate, or as a paste or as milk or cream of lime. To secure the best results briqueting or forming into shape should take place before material setting has occurred.

The action of the lime or other precipitant employed is that of true precipitation or coagulation, as the product in its preferred form is unattacked by boiling water although the sulfite liquor in the acid form preferably used is readily soluble in cold water.

On the weight of the coal employed from 6 to 10 per cent. of sulfite liquor may be used, the proportion varying between these or other limits according to the character of the coal, amount of briqueting pressure, and so forth. The coal particles need not be uniformly coated with the sulfite liquor provided sufficient of the latter be present to secure the required bonding effect.

Tests made with such briquets by exposing to a strong spray of water showed a plain sulfite liquor briquet to fall to pieces in ten minutes while the limed product resisted perfectly for a period of four hours when the test was discontinued.

Although the reaction takes place readily in the cold with the lime reagent as above, heat may be employed if desired to modify the reaction. When precipitants other than lime are used the conditions should be adjusted to meet any modification of the reaction under the circumstances. Similarly although the process is described more particularly with reference to the production of briquets it will now be evident that the reaction may be applied to other fields where it is desired to precipitate sulfite liquor to yield an insoluble product, especially as distinguished from "salting out" procedures known in the art. Thus flooring, tool handles, blocks, and all kinds of molded products may be obtained. Added to paper stock in the beater engine, the sulfite liquor solids may be thrown down with lime or similar precipitant, giving a sizing material which serves for some of the darker shades of paper at least, and such size may be used in conjunction with rosin or other size if desired.

For convenient shipment and for certain other reasons including readiness with which the material may be incorporated with the coal or similar stock, the sulfite liquor may be dried to a solid and ground to a powder which yields the material in a pulverulent condition. This powder is then mixed with the coal, lime being added before or after or with such mixture, and water incorporated so as to cause the reaction either in the bulk mass or after forming into briquets.

Similarly a pulverulent product consisting of a mixture of the dry sulfite liquor solids and hydrated lime may be prepared for use as a binder.

Other precipitants than lime may be employed as stated. Preferably however, a basic body such as lime or barium hydrate is recommended and preferably with the acid sulfite cellulose waste liquor, it being desirable to have only a moderate degree of acidity to permit of the reaction taking place with effectiveness.

Barium hydrate is not as powerful a precipitant as calcium hydrate, on some liquors. Lime is a specific precipitant. Another consideration is that in the case of briquets it becomes necessary to consider the ash of the fuel. Any addition of sulfur compounds such as pyrite is of course regarded as objectionable, while lime is even advantageous as it softens the clinker rendering same less likely to freeze to the stove fire box or grates. With 6% of sulfite liquor and 3% of lime the resulting ash is not objectionable in the case of most grades of coal, both anthracite and bituminous.

It has been noted by Pollacsek (German Patent 100,550) that sulfite waste liquor could be used as a binding material for making briquets but that the application of concentrated sulfite waste liquor in this manner had certain disadvantages, among which was the cost of concentration. He therefore made use of the crude cellulose sulfite waste liquor without any treatment whatsoever, and claimed the advantage of eliminating the cost of concentration and of purification. He states that he uses the crude liquor without any purification, which is mixed with fragments of coal or turf, with the addition of a small amount of lime and magnesia. He recommends 1 part of the crude liquor to 5 parts of coal fragments, to which is added about 1% of quick lime and $\frac{1}{2}$% magnesia, calculated on the weight of the mixture. There is no suggestion by him of carrying out the operation to produce a coagulated sulfite liquor acting as a waterproof or weather-proof binder and furthermore there is the disadvantage in his method that the treatment of more or less porous material with the liquor in its crude state causes a considerable amount to be taken up by capillary spaces and rendered useless at the surfaces where binding is required, so that the binding effect is not satisfactory as it should be. Another point is that the crude sulfite waste liquor contains acid material including sulfurous acid, which if not completely neutralized by the lime employed would tend to oxidise to sulfuric acid and have a disintegrating action. The presence in the composition of sulfites changing to sulfates with more or less expansion and change in hydration is undesirable. In the present invention the concentrated liquor employed may be of such a viscosity or consistency as not to penetrate into the capillary spaces but to largely remain at the contacting surface of the bulking material so as to act as a binder of high efficiency. In the process of concentration the free sulfurous acid is expelled and by my method of neutralization as indicated above in a preferred form, a substantially to major portion of any acids or acid compounds are neutralized to a large extent so that as evaporation progresses under such conditions a form of the sulfite waste liquor solids is obtained which is readily coaguable and more effective than the stable solids of the crude product. The use of 50% or so of lime based on the amount of the concentrated sulfite cellulose liquor employed in the briquet enables a neutral to alkalin reaction to be obtained so that the equilibrium of the acid composition is upset and a satisfactory precipitation and coagulation of the solids ensues in the briquet.

A very satisfactory method of freeing the sulfite liquor from free sulfurous acid is that of concentrating to a thin syrup in a vacuum pan or any other suitable manner and in atomizing the syrup with heated air to produce a dried pulverulent atomized solid material which has a very stable character but which reacts in the presence of moisture and heat especially when rendered alkaline by lime and the like to form a coagulated product such as is referred to above. A binding material of this character is described in my co-pending application Serial No. 779,516 renewed as Serial No. 239,882. A briquet may be made from such composition by admixing 3 to 6% of this pulverulent material with coal fragments, adding water and a small amount of hydrate of lime to secure an alkaline reaction, in briqueting and heating to form a soluble product, and one feature of the present invention is the use of such dried cellulose sulfite waste liquor solid in combination with a bulking agent such as coal fragments, iron ore or other mineral matter and the like to form a molded mass such as a briquet and in insolubilizing the binding agent to produce a substantially waterproof or weather-proof mass capable of resisting the effect of weather and moisture under such conditions as would normally be required of fuel briquets and the like.

As I have stated in Serial No. 779,516 renewed as Serial No. 239,882 waste sulfite cellulose liquor solids in the form of a powder or granular fragmental material or in paste form may be prepared in such condition as to be readily soluble in water so that the dried stock material may be reduced or dissolved in water to make a solution of the desired density and viscosity at the time of use. The concentrated sulfite cellulose liquor of, say, a gravity of 30° Bé., as such is a fairly stable composition but being dried to a solid material such as a powder, is likely to undergo undesirable changes which would render it insoluble or prone to become insoluble in storage. By employing the method described herein a product is obtained which is of a dry, fragmental or pulverulent character of such stability that it may be packed in slack cooperage, such as floor barrels which are pervious to air and in this condition may be stored in such air-pervious packages for an indefinite period without becoming sticky and agglutinated even in air containing a fair amount of humidity. In the preferred form of the present invention a pulverulent product is used which shows quite a marked resistance to atmospheric influences, as for example, when a fine powder of ordinary dried solids of sulfite liquor prepared according to the processes heretofore proposed, is exposed in thin layers to air, in a short time it tends to become rather sticky and gummy, while in the present case the pulverulent material in the preferred form is more resistant under like test and yet is of a sufficiently unstable nature to be suitably coagulated when heated in a briquet under normal coagulating conditions.

Solutions of the dry sulfite liquor solids may be readily made by dissolving these solids in water to produce solutions of any desired strength, such for example, as a syrup composition of 25-30° Bé. containing say, 30-50% of solid material and in place of water as a solvent aqueous media of various kinds, such as saline solutions and the like may be employed to such an extent as may be desired.

The addition to the sulfite liquor of a compound such as silicate of soda may be made to assist in the binding action and in the coagulation by heating. The change in the composition of the sulfite liquor material by the addition of silicate of soda usually is not immediate at first but on standing reaction takes place and especially if the material is used in a briquet the coagulating and binding effect becomes quite apparent. The addition of 10 to 15% of petroleum oil such as asphaltic oil may also be made along with the sulfite liquor in preparing a waterproof briquet and even in some cases 3 to 5% of oil may be employed and 1% or so of calcium stearate.

In the manufacture of briquets from culm or similar mineral material the dry binder of the character particularly specified may be merely incorporated with the dry material and the mixture afterward wetted and pressed into shape. In the preferred form of the invention a solid binder is employed and this material is characterized in that a solution thereof has considerably less viscosity, usually from 10 to 50% less viscosity than ordinary sulfite cellulose waste liquor which has been merely concentrated to that point without having previously been dried and then diluted with water. Hence there is an advantage in some cases in concentrating the liquor, drying to a solid form and then dissolving this solution in water because thereby a solution of higher strength is better obtained for a given viscosity in the preferred form of the present invention and this is quite frequently of advantage in connection with the problem of briqueting bulking material of a variety of characteristics. In some cases briquets or other products prepared from such dried solids of the sulfite waste liquor of less viscosity show fewer hair lines or cracks and greater resistance at atmospheric or mechanical erosion.

From the foregoing it will be readily understood that, by the concentration of waste sulfite liquor, the product is rendered substantially free from sulfurous acid so that the action of sulfurous acid on the added lime is avoided, and sulfur, which is objectionable in briquets, is reduced to a minimum. It will also be readily understood from the foregoing description that, by reason of the chemical reactions which take place during concentration, the constituents of the sulfite liquor which are better acted upon by a reagent such as lime, in my process, are in a chemically unstable condition as compared with their condition in unconcentrated sulfite liquor so that, upon the addition of lime the desired reactions take place in an effective manner, especially when the mass is heated.

The present application is in part a continuation of my copending application Serial No. 757,301 now Patent No. 1,246,805, filed March 28, 1913, Nov. 13, 1917.

What I claim is:—

1. A process of making shaped articles, which comprises incorporating dried pulverulent sulfite waste sulfite liquor solids, an agent capable of insolubilizing the same, a waterproofing agent, water, and a material to serve as a filler, and shaping the mass.

2. A process of making shaped articles, which comprises incorporating dried, slightly oxidized, atomized, pulverulent sulfite waste sulfite liquor solids, an agent capable of insolubilizing the same, a waterproofing agent, water, and a material to serve as a filler, and shaping the mass.

3. A process of making shaped articles, which comprises incorporating dried, pulverulent sulfite waste sulfite liquor solids, an agent capable of insolublizing the same, a waterproofing agent, water, and fine fuel, and shaping the mass.

4. In the production of shaped products containing sulfite waste liquor acid solids, the step of adding an agent capable of insolubilizing the said liquor solids and an oil in amount sufficient to at least partially water-proof the product.

5. The process of making briquet fuel which comprises drying sulfite waste liquor in an acid state, then reducing the product to a powder, adding an asphaltic oil thereto, mixing such product with fine coal material, and a calcareous material, moistening and shaping the mass and heating to render the sulfite liquor solids insoluble in water.

CARLETON ELLIS.